United States Patent
Morici (10) Patent No.: US 6,233,522 B1
(45) Date of Patent: May 15, 2001

(54) AIRCRAFT POSITION VALIDATION USING RADAR AND DIGITAL TERRAIN ELEVATION DATABASE

(75) Inventor: Martin M. Morici, Timonium, MD (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/348,722

(22) Filed: Jul. 6, 1999

Related U.S. Application Data (60) Provisional application No. 60/092,026, filed on Jul. 6, 1998.

(51) Int. Cl.$^7$ .................................................... G01C 21/30
(52) U.S. Cl. .......................... 701/208; 701/214; 342/64
(58) Field of Search ................................... 701/208, 210, 701/211, 213, 214, 301, 217; 340/961; 342/357.12, 64, 451, 357.14

(56) References Cited

U.S. PATENT DOCUMENTS

| | | | |
|---|---|---|---|
| 4,144,571 | 3/1979 | Webber | 364/450 |
| 4,495,580 | 1/1985 | Keearns | 364/450 |
| 4,829,304 | 5/1989 | Baird | 342/63 |
| 4,910,674 | 3/1990 | Lerche | 364/443 |
| 4,914,734 | 4/1990 | Love et al. | 342/64 |
| 5,331,562 | * 7/1994 | McGuffin | 701/213 |
| 5,654,890 | 8/1997 | Nicosia et al. | 364/428 |
| 5,661,486 | 8/1997 | Faivre et al. | 342/33 |
| 5,936,552 | * 8/1999 | Wichgers et al. | 340/963 |
| 5,945,926 | * 8/1999 | Ammar et al. | 340/970 |
| 6,076,042 | * 6/2000 | Tognazzini | 701/301 |

* cited by examiner

*Primary Examiner*—Tan Nguyen (57) ABSTRACT

A radar gathers terrain data which is compared to a stored terrain data base using a test statistic. The test statistic can be used to validate the terrain data base information and/or the aircraft position data.

21 Claims, 9 Drawing Sheets

AIRCRAFT POSITION VALIDATION USING RADAR AND DIGITAL TERRAIN ELEVATION DATABASE

CROSS-REFERENCES TO RELATED APPLICATIONS

This application claims priority from U.S. Provisional Application No. 60/092,026, filed Jul. 6, 1998, which is hereby incorporated by reference for all purposes.

BACKGROUND OF THE INVENTION

The present invention relates generally to aircraft positioning systems, and more particularly to a system and method for validating a position of an aircraft with cross-referenced information sources.

A major cause of aircraft accidents is the failure of an aircraft's positioning systems to adequately alert pilots of their true position, especially relative to variations in the terrain around them, such as with hills and mountains. Recent advances in aircraft navigation systems have done much to alleviate the problem of making a pilot aware an aircraft's position relative to terrain elements. Specifically, U.S. Pat. No. 5,839,080, owned by AlliedSignal, describes a terrain awareness system (TAS) to alert a pilot to terrain threats within a proximity of the aircraft. Further, Allied Signal's Enhanced Ground Proximity Warning System (EGPWS) provides a display of potentially hazardous terrain in an area surrounding a position of the aircraft as that position is reported by the flight management system (FMS) and/or other on-board navigation systems, such as a global positioning system (GPS) receiver. The terrain data is retrieved from a terrain database, such as a digital terrain elevation database (DTED).

Two sources of error may exist in conventional aircraft positioning systems. First, there may be errors in the terrain database. Second, there may be errors in the aircraft's reported position.

SUMMARY OF THE INVENTION

The present invention solves the problems of the prior art by utilizing an aircraft radar and a terrain database to correlate aircraft position information. The present invention can also use terrain data gathered from the aircraft radar to correlate and verify the data stored in a terrain database.

According to one aspect of the present invention an aircraft radar is utilized to obtain terrain reflectivity data. The terrain reflectivity data is then compared to terrain data stored in a terrain data base using a test statistic. The test statistic indicates the degree to which the radar terrain reflectivity data and the terrain data base data agree.

According to another aspect of the present invention, the invention utilizes an aircraft weather radar obtain the terrain radar reflectivity data. Use of the weather radar eliminates the need for separate dedicated radar and the additional cost and weight penalties associated therewith.

According to yet another aspect of the present invention, the invention further includes a tilt management system and/or method. The tilt management system permits the radar tilt angle to be set for optimal scanning of the terrain. The tilt management system also reduces pilot workload by avoiding the need to manually set the tilt.

According to still another aspect of the present invention, the present invention includes a scan interleaving function that permits the weather radar to scan for weather on certain sweeps and for terrain on other sweeps. The interleaving and tilt management function maximizes the utilization of the weather radar and automates the terrain data collection process, while not compromising the collection of weather data.

DESCRIPTION OF THE SPECIFIC EMBODIMENTS

Figure 1:
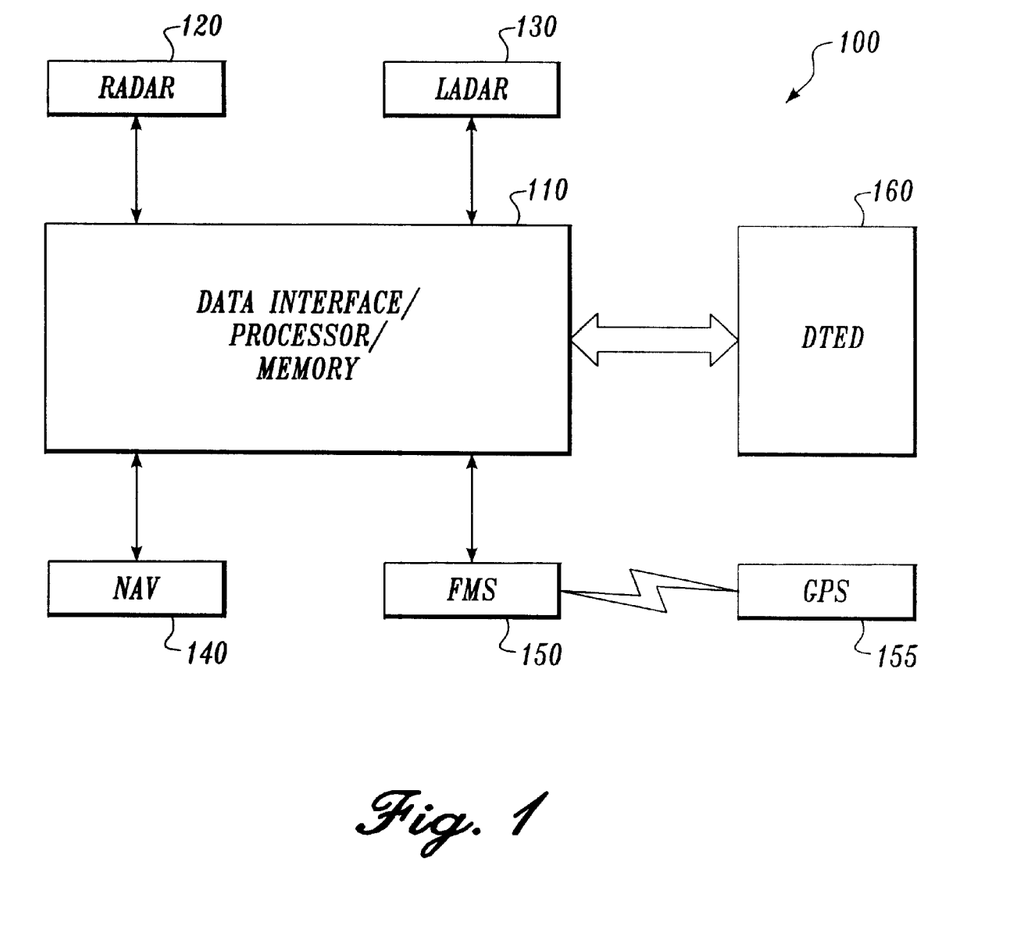
FIG. 1 is a simplified block diagram of a position validation system according to an embodiment of the present invention.

In the apparatus of FIG. 1, in an aircraft positioning system 100, a position validation apparatus is generally identified with the reference number 110. As will be discussed in more detail below, the position validation system accumulates position information from active sensors such as a radar system 120 and/or a ladar system 130, a navigational system (NAV) 140, and/or a flight management system (FMS) 150. Data accumulated from the navigational and positional systems are correlated with information provided by a digital terrain elevation database (DTED) in a process described in greater detail below.

Description of Inputs

The radar data from radar system 120 is preferably provided by a scanning, airborne weather radar. The data is collected at a set of uniformly spaced azimuth angles as the antenna is scanned in azimuth about the nose of the aircraft, at relatively shallow grazing angles (i.e. <15°). The radar produces a map of signal strength as a function of range and azimuth. The range is determined by the radar's range scale (RS) setting and the azimuth (AZ) is determined by the position of the scanning antenna at the time the pulse is transmitted. Pulsed repetition frequencies (PRF) ranging from 190 Hz to 6 KHz are preferably used in the correlation processing algorithm. The radar signal returns should be kept unambiguous in range. Consistent with typical weather radar displays, the signals provided to the correlation algorithm may be quantized in 10 dB steps relative to a sensitivity time control (STC) curve. This STC curve maintains a target of constant cross section to be maintained at the same quantization level independent of range to the target. A minimum threshold is set at approximately $10^{-4}$ to maintain a maximum probability of detecting a noise sample as a signal detection. Any cell exceeding this threshold is classified as a ground clutter return. Any cell not exceeding this threshold is classified as a noise return. In a preferred embodiment, the antenna's 3 dB beamwidth is ~3° in both azimuth and elevation. The radar's range resolution is dependent on the radar's range scale and varies from 150 m to 2700 m.

The laser detection and ranging (ladar) data from the ladar system 130 is provided in an alternative embodiment, the data from which is provided in a similar manner as the radar data.

The FMS 150 provides positional information, and utilizes inputs from a satellite-based navigational system such as global positioning system (GPS) 155 that provides data such as the aircraft's longitude, latitude, altitude, groundtrack, and ground space. The FMS 150 may also be an FMS/IRS navigational system that is updated by the GPS, VOR/DME, and/or DME/DME. A terrain database, and/or an airport database, which are not shown, may also be part of the aircraft's on board systems. Additional sources of altitude data include the radar altimeter and barometric altimeter, also not shown for ease of illustration.

The NAV data includes aircraft dynamics such as roll, pitch and heading, roll rate, pitch rate, and heading rate. In a preferred embodiment, the navigation systems data is updated at 64 Hz increments.

The digital terrain elevation database (DTED) 160 identifies the maximum terrain height within a database cell size. Typical cell sizes for the database are 15 arc seconds, 30 arc seconds and 60 arc seconds in both latitude and longitude. In a preferred embodiment, the database is maintained in the WGS-84 system using latitude, longitude and elevations are maintained in meters above sea level. The terrain data may also be contained within and provided by a preexisting aircraft device, such as, for example, an Enhanced Ground Proximity Warning System (EGPWS) described above.

Hypothesis Testing

There is no way to definitely confirm an aircraft's reported position due to the statistical nature of the radar signals. However, by accumulating evidence from a variety of positional systems, it is possible to reject the aircraft's reported position as an unlikely event given active sensor data and DTED data. The method of the present invention is based on the statistical concept of hypothesis testing. A test statistic is defined which is used to determine if there is sufficient evidence to reject the conjecture that the information in the DTED along with the outputs from the aircraft's NAV, and FMS are consistent with the active sensor readings. This method is applicable to real beam radars, monopulse radars, and laser radars.

According to one embodiment of the present invention, the first step in the hypothesis-testing algorithm is to identify a null hypothesis ($H_O$) and an alternative hypothesis ($H_A$) where:

$H_O$=the radar data; NAV data, FMS data and/or DTED data are consistent with the reported position;

$H_A$=the radar data; NAV data, FMS data and/or DTED data are inconsistent with the reported position.

Figure 2:
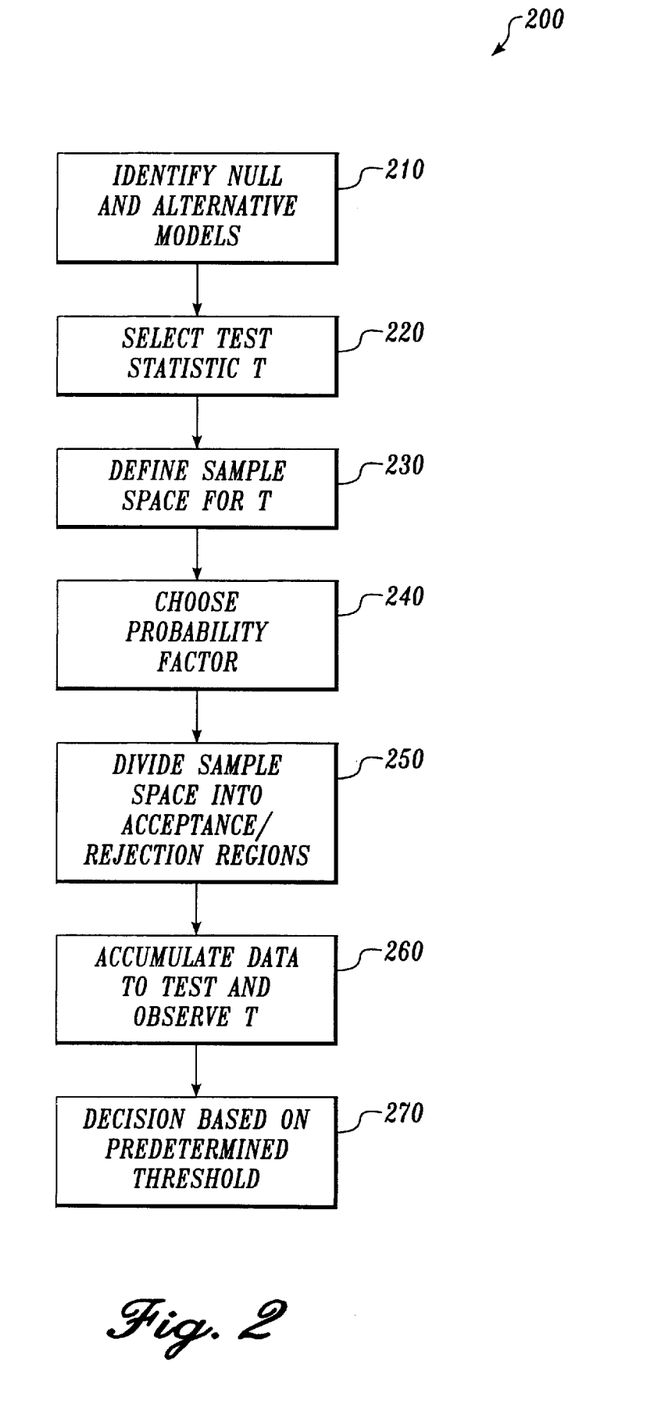
FIG. 2 is a process diagram to illustrate the major steps of a hypothesis testing method according to an embodiment of the present invention.

If any of the inputs are inconsistent with the others, to a predetermined degree, the null hypothesis should be rejected. FIG. 2 shows the major steps in a hypothesis testing method 200 according to an embodiment of the present invention.

At step 210 the Null ($H_O$) and Alternative Models ($H_A$) are identified. At step 220, a test statistic (t) is selected. The test statistic is defined as the fraction of the total number of classified radar map cells (signal or noise) that cannot be explained by the NAV data, FMS data, DTED data and radar system impulse response. The process by which cells are classified as unexplained noise or unexplained signal is described in the flow diagram in FIG. 4.

At step 230, a sample space for t is defined, and at step 240, a probability $\rho$ is chosen, where $\rho$ is the probability of falsely rejecting the Null Model $H_0$. At step 250 the sample space is divided into acceptance and rejection regions such that $P(Rejection|H_0)<\rho$; and $P(Acceptance|H_A)$ is as small as possible.

At step 260 a test statistic value=t is obtained and observed. At step 270 a processing decision is made, where if t is an element of the rejection region, $H_0$ is rejected and $H_A$ will be concluded (or a rare event will be concluded to have occurred). If t is an element of the acceptance region, there is insufficient evidence to reject $H_0$, or in other words, the data is consistent with $H_0$ and the reported position is not rejected.

Figure 3:
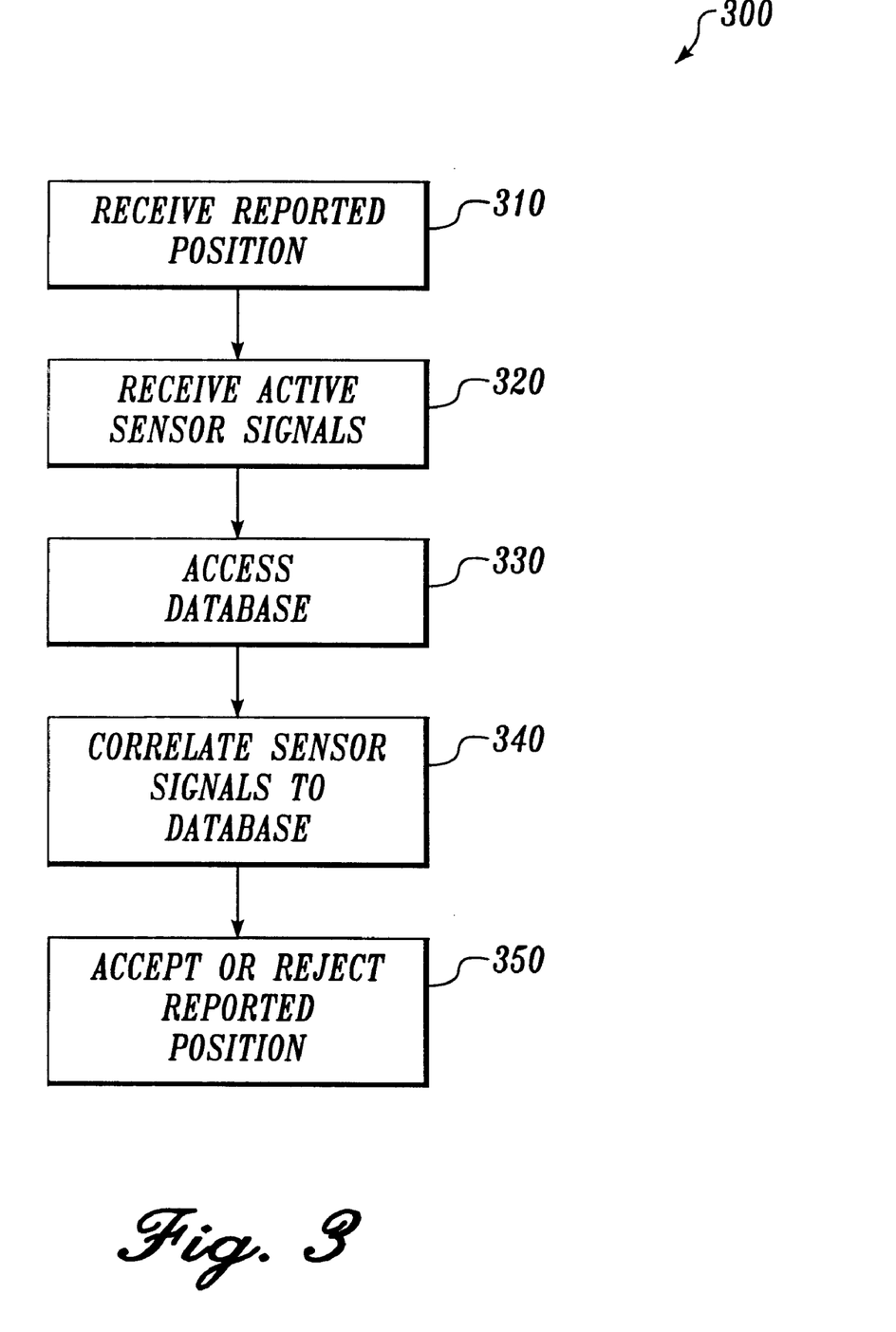
FIG. 3 is a simplified process diagram of a method of validating a position of an aircraft according to an embodiment of the present invention.

FIG. 3 illustrates a method 300 of validating a position of an aircraft according to an embodiment of the present invention. At step 310, signals representative of a reported position of the aircraft are received. The reported position is an approximation of an actual position and includes values representative of the positional data described above in reference to the data inputs. At step 320 active sensor signals are received that are representative of terrain of a map area surrounding the actual position of the aircraft. The actual position is unknown. At step 330 a database of terrain information, such as from DTED, for example, is accessed. The accessed area of interest for the terrain information corresponds to the map area provided by the active sensor in step 320. At step 340 the radar signals are correlated with the terrain information to compute a difference therebetween. The process of correlating is described in much greater detail with reference to FIG. 4. According to the information computed at step 340 a decision will be made at step 350 whether or not to reject the reported position according to a predetermined threshold.

A step in the hypothesis testing of the present invention is determining a suitable test statistic t. A preferred process 400 for determining t will now be described and with reference to FIG. 4. A data interface 401 collects data from one or more position information sources (402, 403 and 404). In particular, the data interface accesses a database 404 of terrain information that is cross-referenced to map area provided by the radar bus 403. The first step 405 in the computation of the test statistic is to down sample the radar data such that a pixel and/or cell resolution of the radar data is substantially matched to that of the terrain database. A sliding maximum filter is used in both range and azimuth to preferably achieve a 2:1 oversampling of the radar data to the terrain database at the maximum range of the radar range scale.

Figure 4:
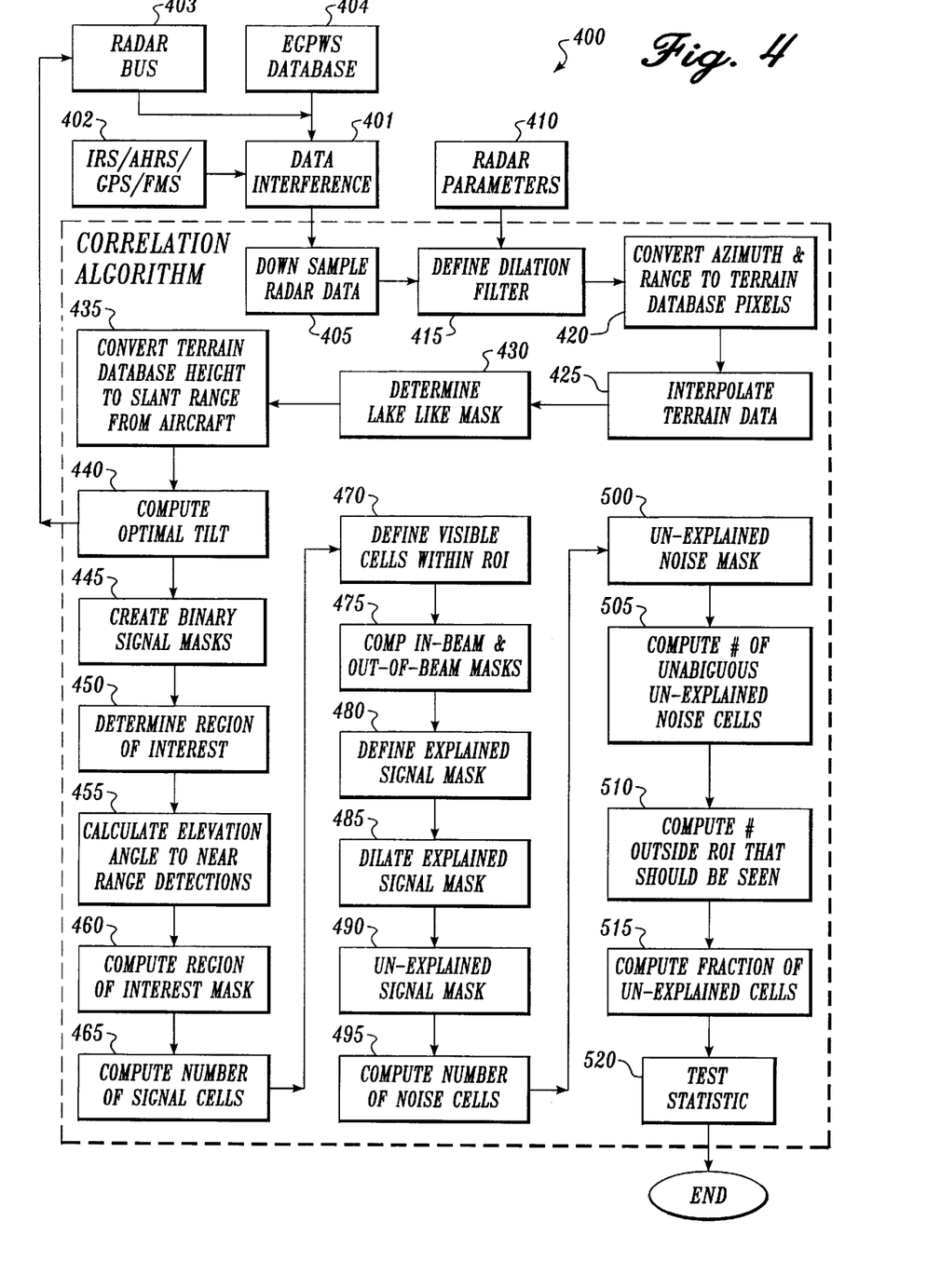
FIG. 4 is a process diagram showing a step of correlating flight position sensor data with a terrain database according to the present invention.

The define dilation filter step 415 receives radar parameters 410 from the active sensor source, and computes the radar's impulse response as a function of range and azimuth. The impulse response is then sorted into descending amplitude order and maintaining offsets in both range and azimuth, and listed in a memory of the position validation system. This ordered list will be used to determine if a signal cell can be explained by the radar's impulse response pattern. Next, at step 420, the azimuth range map is converted to terrain database pixels, by mapping the azimuth and range to a terrain database pixel position in the local ground plane.

At step 425 an upper & lower bound terrain database height is estimated for each range azimuth cell in the radar map. The upper bound is defined as the terrain database pixel height corresponding to the position of the center of the radar's range azimuth cell. The lower bound is defined as the minimum of the 4-connected cells in the terrain database surrounding the center of the radar's range azimuth cell less the DTED database quantization stepsize. A "Lake Test" is performed on the terrain database cell at step 430. A terrain database cell is declared to be "lake like" if its 8-connected neighbors are all of the same height. This is also true if the cell is known to be water, such as a lake or ocean, in anticipation of radar returns of terrain features that exhibit no significant elevation variation. Returns from small lakes, rivers and roadways cover a small fraction of the azimuth beam width, and are therefore "filled in" by antenna impulse response from the adjacent terrain returns. The radar returns from large bodies of water and paved surfaces at shallow grazing angles are characterized by a very small radar cross section ($\sigma_o$<−30 dBsm). These areas can be incorrectly interpreted as shadow regions or regions outside the antenna's elevation beam width if not accounted for specifically as in step 430.

For each range azimuth cell in the radar map, an upper bound and lower bound angle to the terrain database cell is computed using the upper and lower bound height estimates computed in step 435. The range gate (RG) position of each upper and lower bound angle estimate is corrected for the difference between ground range and slant range. The "lake-like" data determined in step 430 is also corrected for ground range to slant range conversion.

At step 440 the optimal tilt of the radar angle is computed, the result of which is provided back to the radar bus 403. A method of computing an optimal tilt angle is the subject of copending patent application No. 60/092,025, owned by AlliedSignal, incorporated by reference herein for all purposes. Two methods for use with the preferred embodiment of the present invention is described below with reference to FIGS. 6 and 7.

Figure 6:
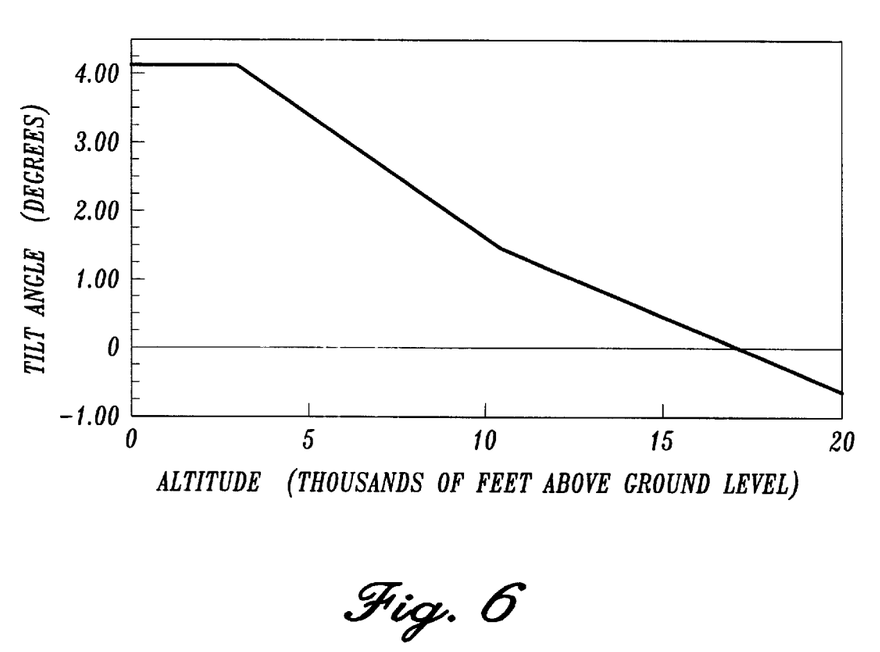
FIG. 6 shows the tilt angle offset reference as a function of altitude for take-off and landing according to the present invention.

In the tilt angle schedule of FIG. 6, the tilt angle is established as a function of aircraft flight phase and altitude. In FIG. 6 the angle given provides the angle best suited to view atmospheric conditions with no or minimal ground clutter. This schedule can be used to provide a tilt angle offset reference for use by the present invention to tilt the weather radar an additional amount to view terrain.

Figure 7:
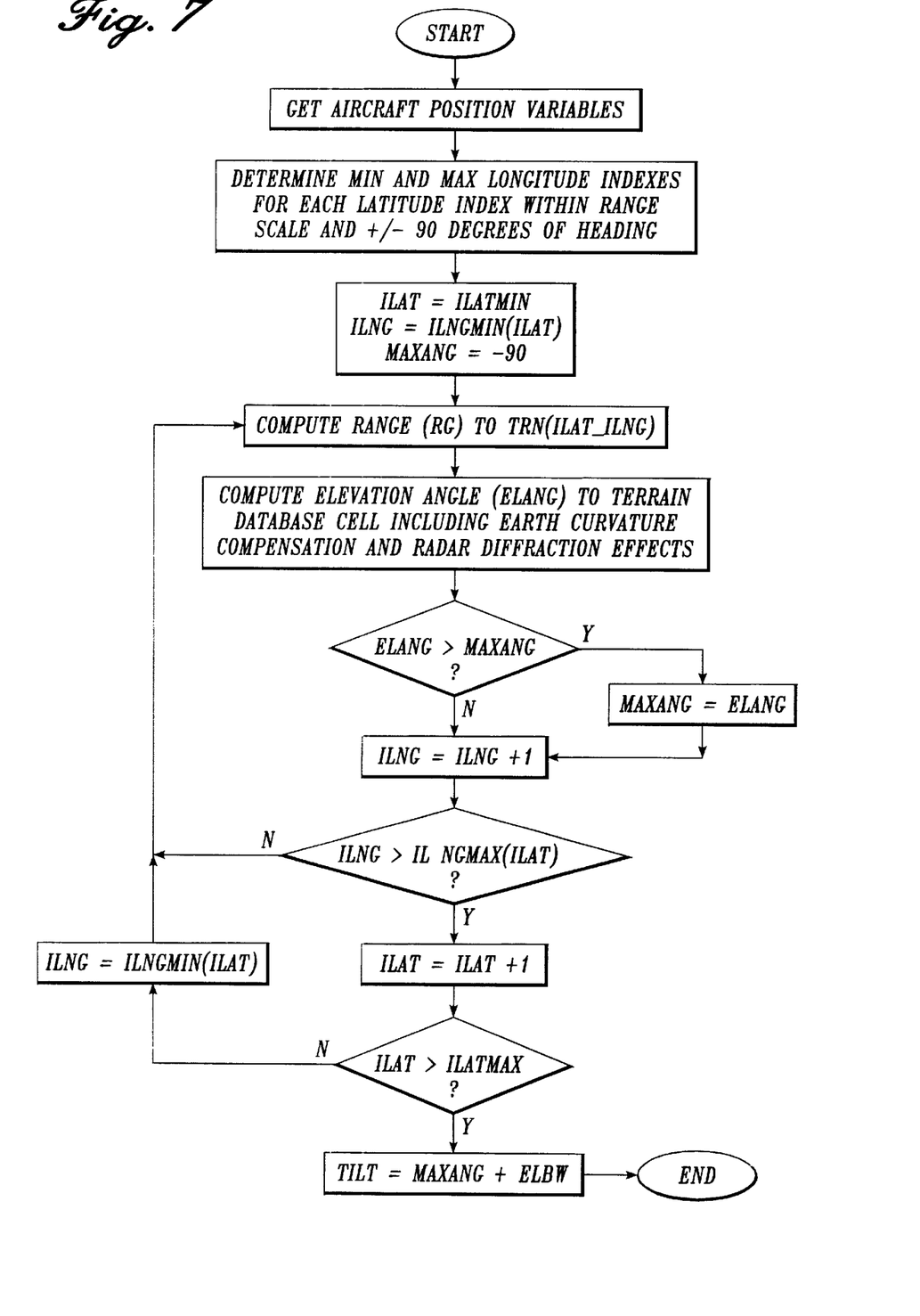
FIG. 7 shows an example flow diagram for the computation of the antenna's tilt angle relative to the aircraft's local horizontal plane according to an embodiment of the present invention.

FIG. 7 describes an alternate method for selecting tilt angle utilizing a terrain data base. The algorithm cam compute the terrain viewing angle directly for use during the terrain viewing radar scan, or as in the embodiment of FIG. 6, an offset angle based on the tilt angle utilized to view weather can be employed.

At step 445, several masks of the cells are defined. First, an edge mask is defined for determining a radar's sweep range, and therefore reliable cell sample size. For each cell, a designation of "true" is applied if the current cell is within half the effective azimuth beam width of the edge of the radar's azimuth sweep, or if the current cell is within half the effective range resolution of the maximum range. These "true" cells are declared to be unreliable sources of unexplained signal. This is due to the uncertainty of the presence of signal sources outside the radar's range azimuth coverage that could be the source of signal returns within this area. Second, a binary signal mask is defined where a particular cell is designated as "true" if the cell is greater than a minimum predetermined signal threshold; otherwise it is set to "false." A "true" value indicates that this cell contains signal returns. A "false" value indicates that this cell contains noise.

At step 450, a region of interest is determined. This step identifies the first radar range gate in each azimuth radial where signal is present, and where that signal corresponds to an angle to the terrain which is within the Null-to-Null beam width of the radar's elevation beam. This step also identifies the last range gate in each azimuth radial where a signal is present.

At step 455 an elevation angle to near-range detections is calculated. This step determines the upper and lower bound angles to the terrain which corresponds to the first N range gates beyond the first radar range gate defined in 3.3.8. The variable N represents the number of radar range samples within the range impulse response of the radar. In radials in which there is no signal present, the upper and lower bound angles are interpolated based on a median fit of the upper and lower bound angles in the radials containing valid data.

A region of interest mask is computed at step 460. During this step, a cell is sets to "true" if the cell is within the near range and far range limits defined in step 445. A separate mask sets a cell to "true" if the cell is within the near range and far range+N range cells as defined in step 450. The additional N cells represent an area of noise cells beyond the last signal cell that should be present to indicate a signal-to-noise transition area. If the far range+N cells exceeds a maximum predetermined range, the mask is only set to the maximum range gate available in the range azimuth map. In a preferred embodiment, N is 3× the range resolution of the radar.

At step 465, a number of signal cells is computed. This number, $N_{signal}$, represents number of signal cells present in the radar range azimuth map and excluding the cells around the edges.

For the range of interest determined above, a number of visible cells is determined by defining two masks, at step 470. The first mask sets a cell to "true" if it is not shadowed by any other cell that contains radar signal return. If this is the case, the cell is considered visible along a direct line of sight of the aircraft. The step compares the lower bound angle to the current cell that contains signal against the maximum upper bound angle of all cells containing signal that are nearer in range than the current cell and in the same azimuth radial. This first mask will be used to determine if noise cells are unexplained due to direct line of sight visibility.

The second mask in step 470 sets a cell to "true" if it is possibly visible along a direct line of sight. The computation compares the upper bound angle to the current cell that contains signal against the maximum lower bound angle of all cells containing signal that are nearer in range than the current cell and in the same azimuth radial. This second mask will be used to determine if signal cells are unexplained due to the absence of even a possible direct line of sight.

In-beam and out-of-beam masks are computed at step 475 by defining two masks. The first mask sets a cell to "true" if the upper bound angle to the current cell is within the minimum beam width of the radar relative to the upper bound angle to the near cells as they are defined in step 455. This "In-Beam" mask will be used to determine if a noise cell is unexplained. The minimum beam width is preferably the 3 dB beam-width of the radar's elevation beam, but may be range scale dependent as well.

The second mask sets a cell to "true" if the upper bound angle to the cell is within the maximum beam width of the radar relative to the upper bound angle to the near cells defined in step 455. This "Out-Of-Beam" mask will be used to determine if a signal cell is unexplained. The maximum beam width is preferably the Null-to-Null beam-width of the radar's elevation beam.

At step 480, an explained signal mask is defined. For a cell to be declared an explained signal, $N_{exsig}$, signal must be present, as shown in step 445, the cell must at least possibly visible as determined by step 470, and the angle to the cell must not be "Out-of-Beam" as defined by the previous step. The total number of explained signals which are not near the edges, as defined in step 445, are maintained for use in the computation of the test statistic.

If a particular cell that contains signal cannot be explained by step 480, then a final test checks these cells' proximity to an explained cell, at step 485. This is done by progressing down the impulse response, step 415, from each explained signal cell, step 480, in order. Given a cell at point P with amplitude Q, it is expected that each step down the impulse response will reduce the amplitude due to point P. Once the amplitude of the test cell drops below the minimum signal strength, the area of support due to the point P ends. To compensate for the effects of receiver noise, the search is continued for an additional N dB once the minimum signal strength has been detected in the search pattern. All cells within this area of support that were previously unexplained are now explained by the radar's impulse response and recorded in a separate mask.

At step 490, unexplained signal cells, $N_{unexsig}$, are determined. This step identifies all signal cells that are not explained as in step 480, not determined as lake-like at step 430, and not edge cells as determined by step 445. For each unexplained signal cell, a weighting factor corresponding to the signal level in the unexplained signal cell is accumulated to indicate a score. This score is used in the final computation of the test statistic.

At step 495, all noise cells, $N_{noise}$, for example non-signal cells that are within the region of interest, as determined by 450 and including the additional N range gates beyond the last signal cell. The number of these cells that are not edge cells is counted and are used in the computation of the test statistic.

Based on the number of noise cells determined in step 495, a number of unexplained noise cells, $N_{unexnoise}$, are identified, as shown in step 500. This step identifies all cells in the region of interest, including the additional N range gates beyond the last signal cell, that are "In-Beam", directly visible, and that correspond to the Noise cells identified in step 495.

At step 505, the number of unambiguous, unexplained noise cells is computed. This step identifies all unexplained noise cells in the region of interest that are not edge cells and are lake-like. Due to the fact that terrain cells covered with water can either behave as a reflective surface, for example choppy water, or non-reflective surface, for example calm water, such cells are ambiguous as to whether or not they are acceptable. These cells are counted and removed from the total number of noise cells to be used in the computation of the test statistic, $N_{ambnoise}$.

Also at step 505, a second mask is created to identify all noise cells that are unexplained, and unambiguous. This mask is computed by identifying all non-lake-like cells that are not edge cells, and identified as unexplained Noise cells. The total number of unambiguous unexplained noise cells will be used in the computation of the test statistic, $N_{unexnoise}$.

At step 510, a number of cells outside the range of interest that should be seen as signal, $N_{sbesig}$, is computed. Step 505 identified all of the noise samples within the extended region of interest that are unambiguous and unexplained noise cells. Step 510 now identifies all of those noise samples in the forward region; those closer to the aircraft in range than the near range cells identified earlier in step 450. The purpose of this step is to identify noise cells that should have shadowed signal cells in the region of interest. The computation of this step is based on the upper bound angle to a cell in the forward region. This angle is compared to the upper bound angle at the signal leading edge. After removing lake-like cells, which should be noise anyway, and edge cells, the number of noise cells in the forward region that should have shadowed signal cells in the area of interest, is counted and provided for the Test Statistic computation at step 520.

The computation of the final test statistic step 520 is given by:

$$TestStatistic = \frac{N_{unexsig} + N_{unexnoise} + N_{sbesig}}{N_{signal} + N_{noise} - N_{ambnoise} + N_{sbesig} - N_{exsig}}$$

The denominator includes:
1) the total number of signal cells present in the entire range azimuth map, plus;
2) the total number of noise cells in the region of interest, plus
3) the total number of noise cells which should be signal in the forward region, minus
4) the total number of ambiguous noise cells, minus
5) the number of signal cells explained by line of sight computations.

The test statistic denominator ideally includes a minimum number of cells. Test statistic including fewer than the minimum number are of questionable accuracy. A preferred number of cells is 200, and is dependent on the radar's range scale.

The numerator is computed by summing the weighted number of all unexplained cells. This includes:
1) the weighted number of unexplained signal cells, plus
2) the total number of unexplained noise cells, plus
3) the total number of should be signal cells.

The test statistic of the present invention has several advantages. Specifically, the test statistic of the present invention will not reject an aircraft position given no discriminating ground information. The test statistic may reject or not reject the null hypothesis with limited discriminating ground information and in highly complex mountainous terrain, may be used to not only reject the aircraft position but may be used to correct the aircraft position relative to the terrain database reference.

With little or no variation in the ground within the radar map area, the test statistic is indifferent to latitude and longitude errors yet the algorithm is still sensitive to altitude errors. With the aircraft flying over level terrain, no CFIT-type danger is present to the aircraft even with aircraft position errors in latitude and longitude. No warnings are provided unless the altitude is significantly in error. With the aircraft flying over moderately hilly terrain, warnings are only produced if sufficient evidence has accumulated in the test statistic to reject the current aircraft position as a highly unlikely or rare event. When flying over unique terrain features, it is possible to not only reject the current aircraft position estimate but also to search the local DTED for the most probable aircraft position. Multiple acceptable positions can then be ruled out based on additional scans until only one alternative remains.

Another advantage of the algorithm of the present invention is its ability to exploit quantized radar signal levels. Areas that would typically be shadowed in the presence of small cross section targets can return signal when a large cross section target is present. By searching down the impulse response, it is possible to discriminate between a signal caused by a few local scattering centers or by an isolated large cross section target. Further, this enables the validation of position with radar antenna ranging in size from greater than 30" diameter down to less than 12" in diameter. The discrimination in this case is reduced as the antenna size is reduced due to beam broadening effects but the fill effects of the wider beam are also handled by the impulse response processing.

It is preferable that returns from ground clutter be detectable if they are visible along the line of sight (LOS) from the true aircraft position. Therefore, radar parameters are ideally selected to generate sufficient signal strength to exceed a clutter detection threshold on clutter-with-clutter cross sections ($\sigma°$) greater than −40 dBsm.

For clutter returns with RCS less than −40 dBsm, additional information can be used which does not depend on the amplitude of specific ground cells. Monopulse techniques known to those of skill in the art such as, for example, monopulse, sequential monopulse, amplitude lobing, and lobe on receive, that are used to determine sub-beam angle measurements, can be used with the present algorithm for rejecting terrain cells that are not consistent with the reported aircraft position and DTED height estimate. U.S. Pat. No. 5,831,570 to the same assignee describes one such monopulse technique.

Weather returns have the effect of raising the background noise level in a radar map. These weather returns are often characterized as having a Doppler component that distinguishes these returns as non-terrain features. By dynamically filtering the radar signal returns outside of main beam clutter, these reflecting free space features can be reduced significantly. The remaining weather features in the map will increase the probability of detecting noise as terrain reflections. The terrain signal threshold must be set sufficiently high to eliminate these weather returns to avoid false terrain signal readings caused by slow moving weather.

The known presence of water, for example oceans and very large lakes, can be strong features to rely upon especially in coastal areas. These features can also be incorporated into the test statistic in much the same way as the lake-like features are included, with the exception that noise aligned with a lake represents an explained noise sample—not an ambiguous unexplained noise sample. This has the effect of increasing the denominator and thus reducing the fraction in the test statistic, making this a more acceptable alignment than without knowing the position of lakes and large waterways.

Figure 5A:
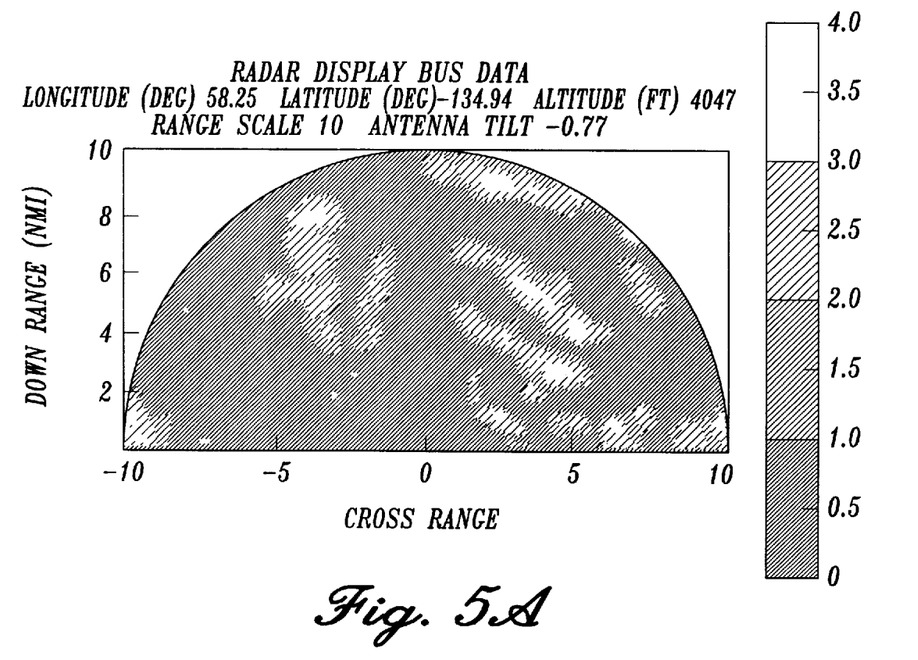
FIGS. 5A–C show examples of correlated data according to an embodiment of the present invention.
Figure 5B:
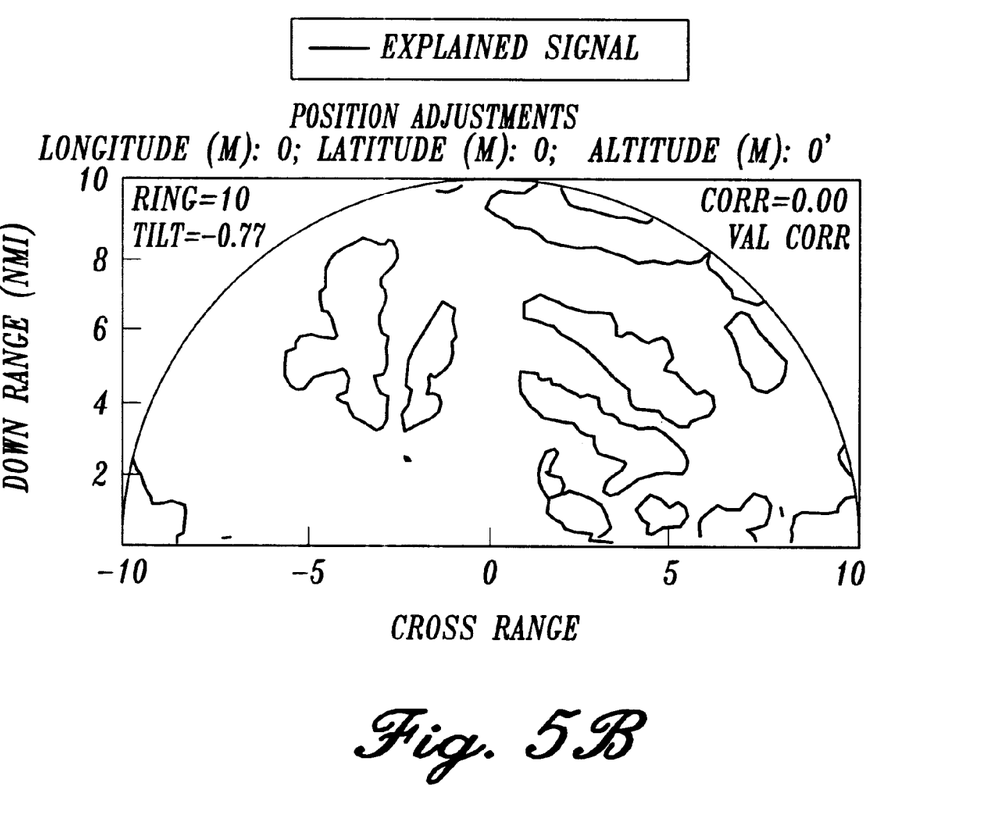
Figure 5C:
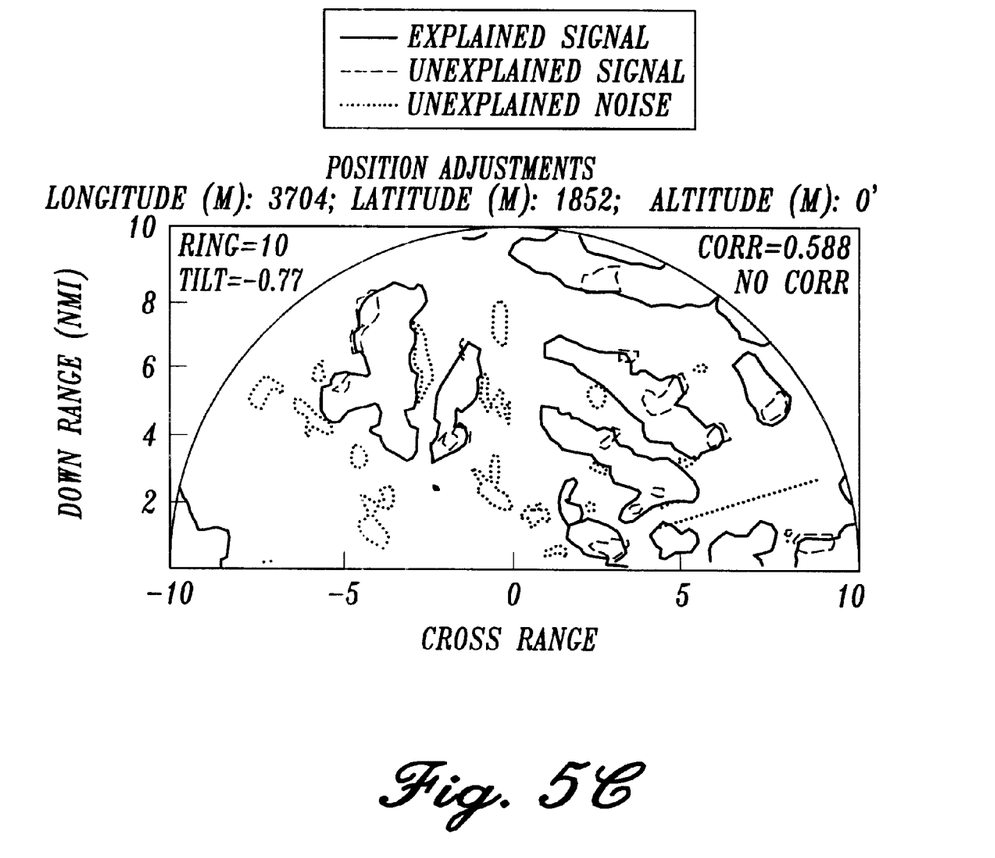

FIGS. 5A–5C show examples of correlated data according to an embodiment of the present invention. FIG. 5A is a simulated radar data display showing four levels of display date where level 1 data is in the 10 dB signal band, level 2 is the 10 dB to 20 dB signal and level 3>20 dB signal level. FIG. 5B is simulated radar data superimposed on terrain database data at the aircraft's true location. Yellow contours indicate explained signal, Red contours indicate unexplained signal, Green contours indicate unexplained noise. The correlation score of 0.0 indicates all signal and noise cells explained by INS data, Radar Display Data, Terrain Database and Radar Parameters. FIG. 5C is simulated radar data superimposed on terrain database data with the aircraft position reported wit a 1 nmi error north and a 2 nmi error east of the aircraft's true location. Yellow contours indicate explained signal, Red contours indicate unexplained signal, Green contours indicate unexplained noise. The correlation score of 0.588 indicates a position error has been detected.

Tilt Angle Management and Sensor Orientation

The radar, lidar, weather radar employed as a terrain sensor is oriented relative to the terrain in a manner such that the sensor detects the terrain during its scan. A tilt angle set too high will cause the sensor to overshoot the terrain and no terrain data will be obtained. A tilt angle set too low may prevent the sensor from detecting high peaks located ahead of the aircraft. The tilt angle is therefore preferably automated to maximize the terrain data return. Furthermore, when the sensor is an aircraft weather radar automatic tilt management reduces pilot workload and enhances the ability of the weather radar to perform these multiple tasks. In addition, when a weather radar is used as the sensor of the present invention, the radar scans are preferably interleaved such that weather is obtained during certain scans and terrain data is obtained on other scans. U.S. Pat. No. 5,831,570, also describes one interleaving procedure useful for this purpose and said patent is incorporated herein by reference for all purposes.

One method for controlling tilt angle can be accomplished using an altitude schedule. In such an embodiment the tilt angle to view terrain is defined as a function of phase of flight and height above terrain. For Example, the radar tilt angle can be set at specified angle for take off and slewed down a predetermined number of degrees for each 1000 feet of altitude gain during climb out. The procedure can be reversed during descent.

According to another embodiment of the present invention, the terrain database itself is used to automatically calculate the tilt angle. One such database is included in the Enhanced Ground Proximity Warning System (EGPWS) manufactured by AlliedSignal. Other databases may be used. This embodiment of the invention utilizes the inputs described below. FIG. 6 describes a tilt angle schedule using these inputs to one embodiment of the invention.

Inputs
1. aircraft altitude for example, relative to sea level (alt)
2. aircraft position for example, in latitude (lat)
3. aircraft position for example, in longitude (lng)
4. terrain database [trn (ilat, ilng)] where ilat represents the latitude index and ilng represents the longitude index
5. radar range scale in for example, nautical miles (10, 20, 40, 80, 160, 320) (RS)
6. database cell size in for example, nautical miles (0.25, 0.5, 1.0, 2.0, 4.0) (CS)
7. half-power elevation beam width of the weather radar for example, in degrees (i.e., the angular distance from the main antenna axis—measured in the vertical plane containing the main antenna axis—at which the signal strength falls to half the maximum value) (elbw)
8. aircraft heading relative to north (where positive is clockwise from north) (hdg)

The schedule of FIG. 7 first determines the values of the aircraft position variables. Then, for each latitude index within the radar range scale and within 90 degrees of the aircraft heading, the minimum and maximum longitude indices within those same limits are determined. The latitude index is then set to the minimum latitude index within the range scale and within 90 degrees of the aircraft heading and the longitude index is set to the minimum longitude index within the range scale and within 90 degrees of the aircraft heading and intersecting the latitude index. A maximum angle variable (MaxAng) is created and set to negative 90 degrees. The schedule of FIG. 7 then computes the distance between the aircraft and the terrain database point that corresponds to the latitude and longitude indices.

Compensating for earth curvature and radar diffraction according to techniques known to those of skill in the art, the elevation angle between the aircraft and the terrain database cell (ElAng) is measured and compared to the maximum angle variable. If the elevation angle is greater than the maximum angle, the maximum angle is set equal to the elevation angle. If the elevation angle is not greater than the maximum angle, the longitude index is increased by one. The longitude index is then compared to the maximum longitude index within the range scale and within 90 degrees of the aircraft heading and intersecting the latitude index. If the longitude index is not greater than the maximum longitude index, then the algorithm loops back to the computation of the distance between the aircraft and the terrain database point that corresponds to the latitude and longitude indices. If the longitude index is greater than the maximum longitude index, then the latitude index is increased by one. The latitude index is then compared to the maximum latitude index within the range scale and within 90 degrees of the aircraft heading. If the latitude index is not greater than the maximum latitude index, then longitude index is set equal to the minimum longitude index within the range scale and within 90 degrees of the aircraft heading and intersecting the latitude index and the method loops back to the computation of the distance between the aircraft and the terrain database point that corresponds to the latitude and longitude indices. If the latitude index is greater than the maximum latitude index, then the tilt angle is calculated by adding the maximum angle to the half-power elevation beam width of the weather radar.

According to one embodiment of the present invention, the weather radar's antenna tilt angle is recomputed each time the aircraft moves outside of a database cell, changes range scale or makes a change in aircraft heading.

The foregoing description of specific embodiments is provided to enable any person skilled in the art to make or use the present invention. The various modifications to these embodiments will be readily apparent to those skilled in the art, and the generic principles defined herein may be applied to other embodiments without the use of the inventive faculty. For example, the test statistic calculation may be performed in an on-board flight computer. Similarly, the invention may be embodied completely in software code residing in a computer memory and executed by a processor. Thus, the present invention is not intended to be limited to the embodiments shown herein but is to be accorded the widest possible scope consistent with the principles and novel features disclosed herein, and as defined by the following claims.

What is claimed is:

1. A method of validating a position of an aircraft, comprising the steps of:
   receiving signals representative of a reported position of the aircraft, the reported position being an approximation of an actual position;
   receiving active sensor signals representative of terrain of a map area surrounding the actual position of the aircraft;
   accessing a database of terrain information corresponding to the map area;
   correlating the sensor signals with the terrain information to compute a difference therebetween; and
   rejecting the reported position of the aircraft when the difference exceeds a predetermined threshold.

2. The method recited in claim 1, wherein the signals representative of a reported position include a latitude value and a longitude value.

3. The method recited in claim 1, wherein the signals representative of a reported position include flight geometry values.

4. The method recited in claim 1, wherein the signals representative of a reported position include an altitude value.

5. The method recited in claim 1, wherein the map area is comprised of a plurality of cells, each cell being defined by an intersection of one of a plurality of uniformly spaced azimuth angles and one of a plurality of range scales.

6. The method recited in claim 5 wherein the active sensor is radar.

7. The method recited in claim 6 wherein the step of correlating further comprises: correlating the radar signals with the terrain information
   matching boundaries and cell resolution of the radar signals to boundaries and cell resolution of the terrain information;
   defining a binary signal mask for cells within the boundaries, the binary signal mask being "true" for a cell if a radar signal of the cell is greater than a minimum signal threshold to indicate presence of a signal, otherwise being "false" to indicate presence of noise;
   defining a region of interest as a subarea of the map area; and
   computing a difference between the radar signals and the terrain information within the region of interest.

8. The method recited in claim 7 wherein the step of computing further comprises:
   determining a number of cells within the region of interest that are visible within the line-of-sight of the aircraft;
   determining a number of cells within the region of interest that are in-beam, such that a cell is containable within a width of a beam of the active sensor; and
   for each visible and in-beam cell being "true," classifying the cell as explained.

9. The method recited in claim 7 wherein the step of computing further comprises:
   using a radar impulse response to explain signal cells in proximity of signal cells visible along a line-of-sight that would otherwise be unexplained signal cells;
   using an amplitude based search down of the impulse response to determine an area of amplitude effected by the given signal cell;
   using the amplitude based search down of the impulse response in the presence of quantized amplitude values;
   using the amplitude based search down of the impulse response in a presence of quantized signals limited in amplitude (preset maximum).

10. The method recited in claim 1, wherein the difference is defined by a test statistic t, having a range $0<t<t_{max}$, where t is defined as:

$$\frac{N_{unexsig} + N_{unexnoise} + N_{sbesig}}{N_{signal} + N_{noise} - N_{ambnoise} + N_{sbesig} - N_{exsig}}$$

and wherein
   $N_{unexsig}$ is a weighted number of unexplained signal cells, where a signal is returned by the active sensor in a cell that the database indicates noise should be;
   $N_{unexnoise}$ is a total number of unexplained noise cells, where a noise is returned by the active sensor in a cell that the database indicates a signal should be;

$N_{sbesig}$ is a number of noise cells that should be signal cells since an angle to a foreground noise cells should have signal cells in the region of interest;

$N_{signal}$ is a total number of signal cells present in the region of interest;

$N_{noise}$ is a total number of noise cells present in the region of interest;

$N_{ambnoise}$ is a total number of noise cells that are ambiguous;

$N_{exsig}$ is a subset of the total number of signal cells that are explained by being visible along a line-of-sight of the active sensor; and wherein t is computed and compared with the predetermined threshold, the predetermined threshold having a value greater than zero.

11. The method recited in claim 1, further comprising the step of searching the terrain database for an adjusted reported position.

12. An apparatus for validating a position of an aircraft, comprising:

an input for receiving signals representative of a reported position of the aircraft, the reported position being an approximation of an actual position;

an input for receiving active sensor signals representative of terrain of a map area surrounding the actual position of the aircraft;

a data interface coupled to a database of terrain information, the interface configured for accessing terrain information from the database corresponding to the map area; and a processor coupled to the data interface that correlates the radar signals with the terrain information to compute a difference therebetween, the processor configured to reject the reported position of the aircraft when the difference exceeds a predetermined threshold.

13. The apparatus of claim 12, wherein the processor is configured to search the terrain database for an adjusted position when the reported position is rejected.

14. The apparatus of claim 12, further comprising a memory for storing instructions, wherein the processor is responsive to the instructions for computing the difference.

15. The apparatus of claim 12, wherein the active sensor is radar.

16. The apparatus of claim 12, wherein the signals representative of a reported position include a latitude value and a longitude value.

17. The apparatus of claim 12, wherein the signals representative of a reported position include flight geometry values.

18. The apparatus of claim 17, wherein the flight geometry values include roll, pitch, and heading.

19. The apparatus of claim 12, wherein the signals representative of a reported position include an altitude value.

20. The apparatus of claim 12, wherein the map area is comprised of a plurality of cells, each cell being defined by an intersection of one of a plurality of uniformly spaced azimuth angles and one of a plurality of range scales.

21. The apparatus of claim 12, wherein the signals representative of a reported position are obtained from a global positioning system (GPS) receiver.

* * * * *